US011927922B2

(12) United States Patent
Favre et al.

(10) Patent No.: US 11,927,922 B2
(45) Date of Patent: Mar. 12, 2024

(54) COILING LIMITATION DEVICE FOR A TIMEPIECE BARREL

(71) Applicant: The Swatch Group Research and Development Ltd, Marin (CH)

(72) Inventors: Jérôme Favre, Neuchatel (CH); Jean-Jacques Born, Morges (CH); Nakis P. Karapatis, Premier (CH); Michel Willemin, Preles (CH); Jean-Claude Martin, Montmollin (CH)

(73) Assignee: The Swatch Group Research and Development Ltd, Marin (CH)

( * ) Notice: Subject to any disclaimer, the term of this patent is extended or adjusted under 35 U.S.C. 154(b) by 248 days.

(21) Appl. No.: 17/317,953

(22) Filed: May 12, 2021

(65) Prior Publication Data

US 2022/0107607 A1 Apr. 7, 2022

(30) Foreign Application Priority Data

Oct. 6, 2020 (EP) .................................... 20000362

(51) Int. Cl.
*G04B 5/24* (2006.01)
*G04B 3/00* (2006.01)
(Continued)

(52) U.S. Cl.
CPC ............... *G04B 5/24* (2013.01); *G04B 3/006* (2013.01); *G04D 7/009* (2013.01); *G04D 7/02* (2013.01); *G04D 7/1264* (2013.01)

(58) Field of Classification Search
CPC ........................................................ G04B 5/24
See application file for complete search history.

(56) References Cited

U.S. PATENT DOCUMENTS 3,621,650 A * 11/1971 Schnyder ............... G04B 1/185 368/207
4,128,003 A * 12/1978 Zanoni ..................... G04D 7/12 73/1.44
(Continued)

FOREIGN PATENT DOCUMENTS

CH 709 910 A2 1/2016
CN 1155107 A 7/1997
(Continued)

OTHER PUBLICATIONS

European Search Report dated Feb. 10, 2021 in European Application 20000362.2 filed Oct. 6, 2020 (with English Translation of Categories of Cited Documents), 3 pages.
(Continued)

*Primary Examiner* — Edwin A. Leon
*Assistant Examiner* — Sean R Brannon
(74) *Attorney, Agent, or Firm* — Oblon, McClelland, Maier & Neustadt, L.L.P.

(57) ABSTRACT

A coiling limitation device for a timepiece barrel includes at least one non-return notch arranged to cooperate with a sliding flange of the spring of the barrel, which is integrated in a watch including a resonator cooperating with an escapement mechanism. This device includes an acoustic device for the acoustic monitoring of the coiling of the barrel of a watch positioned on a receptacle included by the device, which acoustic devices are arranged to identify a click noise during each start of cooperation between the sliding flange and a notch. The device includes piloting devices arranged to stop the coiling of the barrel at the instant of the perception of the click noise or the repetition of the click noise.

10 Claims, 2 Drawing Sheets

(51) Int. Cl.
*G04D 7/00* (2006.01)
*G04D 7/02* (2006.01)
*G04D 7/12* (2006.01)

(56) References Cited

U.S. PATENT DOCUMENTS

| | | | | |
|---|---|---|---|---|
| 2018/0052427 | A1* | 2/2018 | Lieb | G04D 7/009 |
| 2018/0181075 | A1* | 6/2018 | Born | G04D 7/003 |

FOREIGN PATENT DOCUMENTS

| | | | |
|---|---|---|---|
| CN | 101750957 | A | 6/2010 |
| CN | 203689018 | U | 7/2014 |
| CN | 105319937 | A | 2/2016 |
| CN | 206781406 | U | 12/2017 |
| CN | 108227451 | A | 6/2018 |
| EP | 2 485 098 | A1 | 8/2012 |
| EP | 3 079 024 | A1 | 10/2016 |
| EP | 3 096 191 | A1 | 11/2016 |
| EP | 3 339 984 | A1 | 6/2018 |
| JP | 2001-116856 | A | 4/2001 |

OTHER PUBLICATIONS

Office Action dated Sep. 12, 2023, issued in corresponding Chinese patent application No. 202110781577.0 (with partial translation).

* cited by examiner

COILING LIMITATION DEVICE FOR A TIMEPIECE BARREL

CROSS-REFERENCE TO RELATED APPLICATION

This application claims priority to European Patent Application No. 20000362.2 filed on Oct. 6, 2020, the entire disclosure of which is hereby incorporated herein by reference.

FIELD OF THE INVENTION

The invention relates to a device for limiting the coiling of a timepiece barrel including at least one non-return notch arranged to cooperate with a sliding flange included in the spring of the barrel, said barrel being integrated in a watch including a resonator cooperating with an escapement mechanism.

The invention also relates to a device for winding a watch, including means for recoiling a barrel, and at least one such limiting device.

The invention relates to the field of recoiling watch barrels.

BACKGROUND OF THE INVENTION

In recent smart winders, and in particular described in documents EP2650735, EP3096191, EP3163381, EP3339984, EP3572887, EP3719589, EP19215629.7, in the name of THE SWATCH GROUP RESEARCH & DEVELOPMENT Ltd, the winding of automatic watches is stopped when the watch is completely wound, in order to avoid wear of the barrel drum due to the friction of the sliding flange. For this purpose, one solution consists in an acoustic measurement of the escapement noises, carried out by a contact microphone, because these noises allow to estimate the amplitude of the balance-spring, itself representative of the coiling of the barrel.

The difficulty lies in obtaining a correct value for the amplitude of the balance-spring regardless of the watch and regardless of the type of escapement (Swiss anchor, coaxial or the like).

This problem is difficult to solve in a perfectly satisfactory manner. The solution implemented is to measure the amplitude variation rather than its absolute value. When the watch is completely recoiled, the amplitude stops increasing. The winder then servo-controls the amplitude to a certain fraction of the maximum amplitude measured (for example 80%). This method works, but it has the disadvantage of having to wait for the amplitude to stabilise at a high value, which is difficult to detect because the amplitude measurement is very noisy. This can take time, during which the winder winds the barrel to the point that the flange slides, and therefore creates wear.

SUMMARY OF THE INVENTION

The invention intends to detect the complete winding of an automatic watch by identifying the noise made by the sliding flange in the barrel drum.

To this end, the invention relates more particularly to an intelligent winder with detection of the noise of a sliding flange.

To this end, the invention relates to a device for limiting the coiling of a timepiece barrel according to claim 1.

The invention also relates to a device for winding a watch, including means for recoiling a barrel, and at least one such limiting device.

BRIEF DESCRIPTION OF THE DRAWINGS

Other features and advantages of the invention will become apparent upon reading the detailed description which follows, with reference to the appended drawings, where.

DETAILED DESCRIPTION OF THE PREFERRED EMBODIMENTS

The invention intends to detect the complete winding of an automatic watch by identifying the noise made by the sliding flange in the barrel drum.

To this end, the invention relates more particularly to an intelligent winder with detection of the noise of a sliding flange.

When winding a barrel spring, the sliding flange allows excess energy to be released by friction. The spring must however be blocked from time to time, it then slides abruptly into a non-return notch, which causes a characteristic noise.

Figure 1:
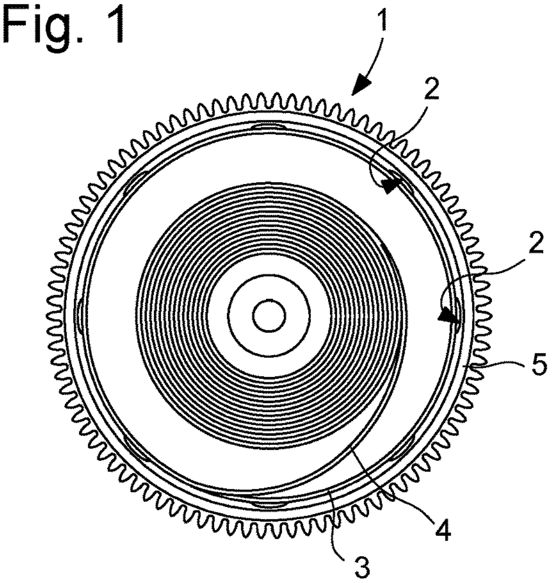
FIG. 1 shows, schematically and planarly, a timepiece barrel in the drum of which is housed a spring with a sliding flange resting on an inner cylindrical surface of the drum, provided with non-return notches.
Figure 2:
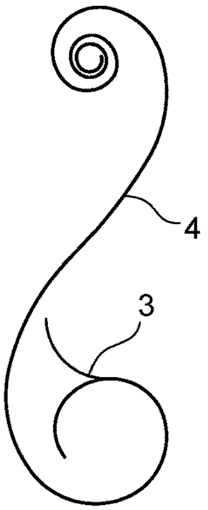
FIG. 2 shows, similarly to FIG. 1, and in the free state, the spring of FIG. 1.

FIG. 1 shows a conventional automatic barrel 1, and FIG. 2 a barrel spring 4 including a sliding flange 3, before it is mounted in the drum 5 of this barrel, which includes non-return notches 2 at its inner periphery, which are eight in number in the non-limiting illustrated example.

It is proposed to identify this noise by acoustic measurement to determine that the watch has been wound.

This solution has the advantage of immediately identifying the instant when the watch is completely wound, which minimises potential wear. In addition, the power reserve when the user takes their watch off the winder is potentially optimised compared to the amplitude measurement method, since the maximum winding is identified with more precision.

Figure 3:
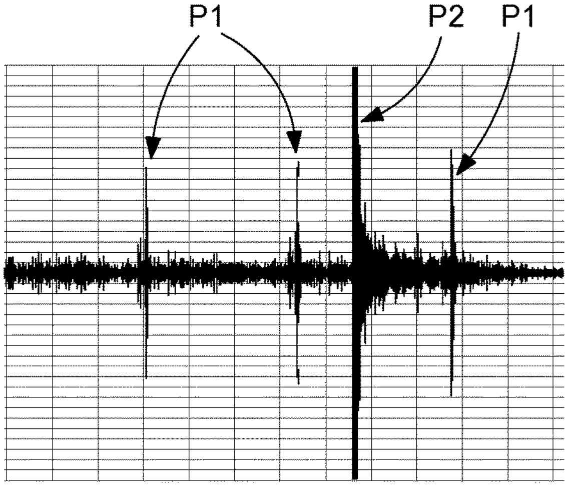
FIG. 3 is a representation of a noise signal sensed by acoustic measuring means, at a watch disposed on a watch winding device, including such a limiting device, where small peaks corresponding to the shocks of the escapement, and a much more prominent peak, which corresponds to the noise of the cooperation of the sliding flange with one of the non-return notches of the barrel drum, can be seen.

FIG. 3 shows the acoustic signal as a function of time when the sliding flange enters the notch. This measurement was carried out on a hand-wound automatic watch Sistem 51 Swatch®. This measurement shows that the acoustic signal from the sliding flange is particularly intense: it saturates even with the current sensitivity and gain settings. The noise of the winding system is also significant: it partially masks the shocks of the escapement, however this does not pose a problem for an intelligent winder wherein the rate and amplitude measurements are made when the winder is stationary. The peaks P1 correspond to the shocks of the escapement, the peak P2 corresponds to the noise of the sliding flange 3 in a non-return notch 2.

Figure 4:
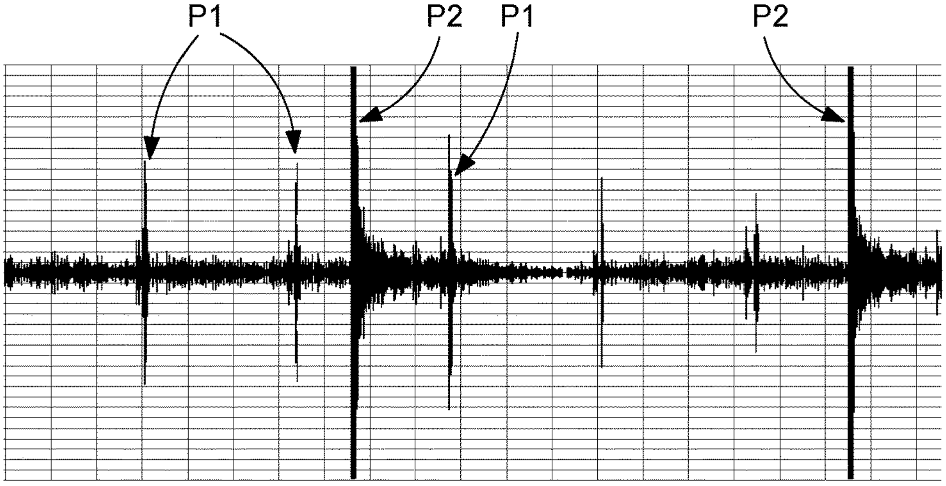
FIG. 4 is similar to FIG. 3, on a reduced scale, and shows two peaks each corresponding to this noise of the cooperation of the sliding flange with one of the non-return notches of the barrel drum, and which relate to two successive notches.
Figure 5:
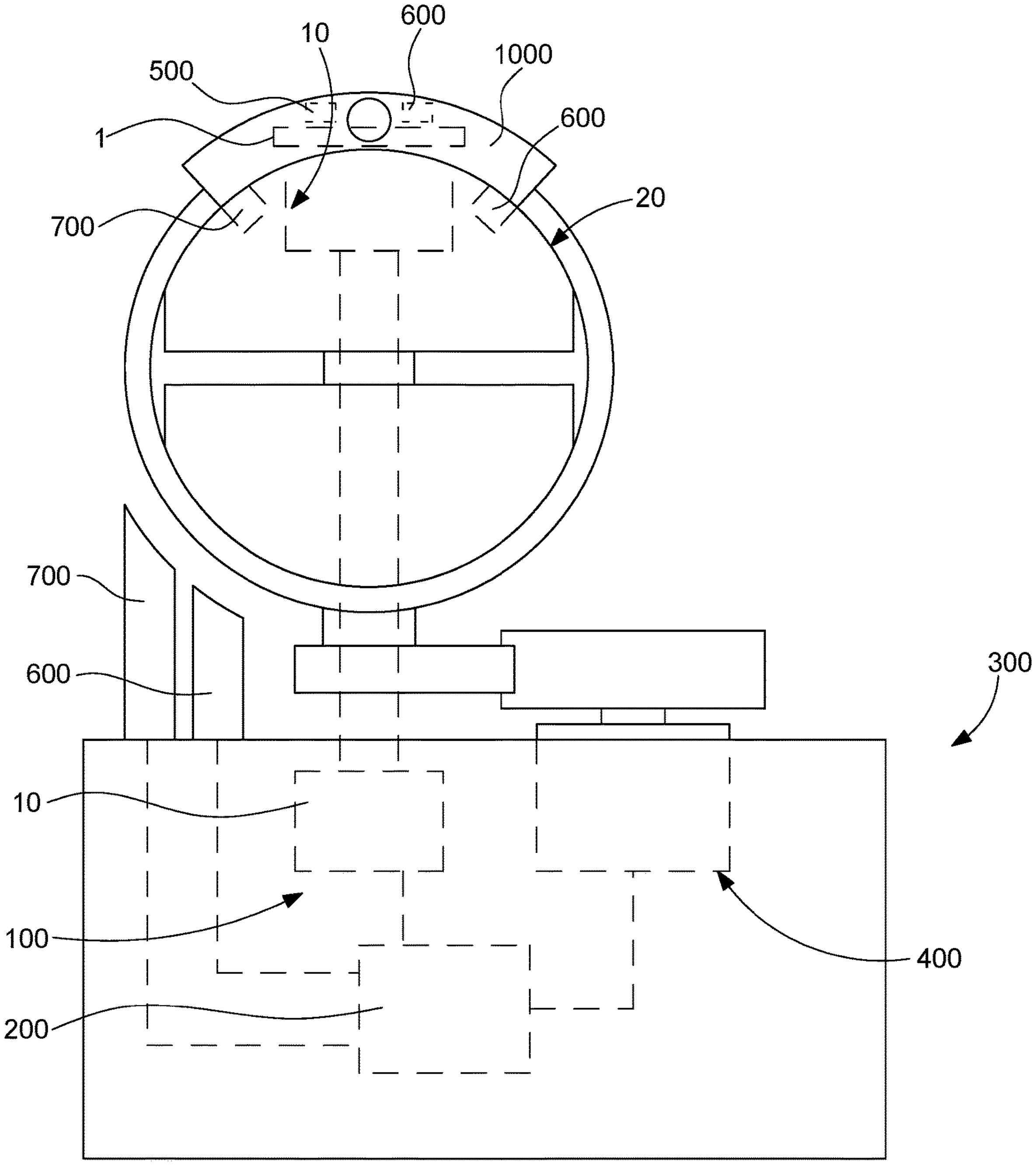
FIG. 5 shows, very schematically with functional blocks, a device for winding a watch, including motor means for controlling the recoiling of a barrel of an automatic watch fixed to a receptacle of the apparatus, provided with sensors, and a limiting device which includes such acoustic means, for the acoustic monitoring of the coiling of the barrel of this watch, and which includes piloting means, which are arranged to control the motor means to stop the coiling of the barrel according to a determined algorithm; these piloting means are, again, interfaced here with means for identifying the watch for its initial calibration, and means for measuring the rate and/or amplitude of the resonator of the watch.

FIG. 4 shows the spectrogram of this signal (the temporal evolution of frequencies). The signature is particularly characteristic and stands out clearly from that of the noise from the escapement and the winding system, in particular in the frequency band comprised between 0 and 2500 Hz. Two successive P2 peaks can be clearly distinguished.

However, it is necessary to listen and analyse the noise of the watch continuously, the consumption of electrical energy is not a problem for a static winder at the user's home, or in a sales store, or the like. Real-time spectrogram analysis can also be resource intensive.

In order to increase the robustness of the detection of the maximum coiling, it is possible not to stop the recharging immediately, but to continue it a little longer in order to obtain at least a second noise which can confirm that the flange is indeed sliding from one notch to another, it is true at the cost of a little greater wear due to the friction during the stroke between these two detections of noise of cooperation of the sliding flange with a notch. This confirmation can also be made only once, to validate the acoustic signature of the sliding of the flange in its notch, and subsequently, to detect only one passage.

The intelligent winder can advantageously keep a measurement of the amplitude, because this is the only one that allows to identify any ageing of the watch and the need for a return to after-sales service. The two analysis methods can very well coexist: the measurement of the noise of the sliding flange for the detection of the maximum coiling, and the measurement of amplitude for the evaluation of the long-term wear.

It is understood that the measurement of the noise of the flange may, in a variant, not be systematic: the measurement of the noise of the flange can be used as an initial calibration, for the qualification of the amplitude measurement. If a watch recognition system is implemented, the winder can assign a coefficient to the watch when it has been calibrated, thanks to the noise of the flange, and only use amplitude measurement, which consumes less electrical energy because it is punctual and not continuous.

The noise of the winding system can also depend on the coiling, even before the flange slides, but the sound signature is differentiated, because the noise of the cooperation between the sliding flange and one of the notches is quite characteristic, and easy to isolate when processing the acoustic signal. It is therefore advantageous to have a low-power algorithm, which searches for and identifies the acoustic signature of such noise. It is also necessary to verify that this noise is similar regardless of the watch, or if not to qualify the characteristic noises, of coiling, and cooperation between the sliding flange and a drum notch, for each type of watch.

More particularly, the invention thus relates to a device for limiting the coiling 100 of a watch barrel 1.

This barrel 1 is integrated into a watch 1000 including a resonator 500 cooperating with an escapement mechanism 600.

The drum 5 of this barrel 1 includes at least one non-return notch 2, which is arranged to cooperate with a sliding flange 3 included by the spring 4 of the barrel 1.

According to the invention, the device 100 includes acoustic means 10, for the acoustic monitoring of the coiling of a barrel 1 of a watch 1000 positioned on a receptacle 20 included by the device 100.

These acoustic means 10 are arranged to identify a reference noise which is a click noise during each start of cooperation between the sliding flange 3 and a notch 2.

The device 100 including piloting means 200, which are arranged to stop the coiling of the barrel 1 at the instant of the perception of the click noise or the repetition of the click noise.

More particularly, the piloting means 200 are arranged to stop or prohibit the recoiling of the barrel during the execution of a measurement by the acoustic means 10.

More particularly, the acoustic means 10 are arranged to identify the reference noise of each input in cooperation between the sliding flange 3 and a notch 2.

More particularly, the piloting means 200 are arranged to store the maximum winding noise of a given barrel 1, and the reference noise, sensed by the acoustic means 10.

And the acoustic means 10 are more particularly arranged to identify the noise of each start of cooperation between the sliding flange 3 and a notch 2.

The piloting means 200 advantageously include filtering means, so as to follow only the noise signals greater than or equal to the reference noise.

More particularly, the piloting means 200 are arranged to stop or prohibit the recoiling of the barrel 1 when the acoustic means 10 sense a noise greater than or equal to the reference noise.

More particularly, the piloting means 200 are designed to stop or prohibit the recoiling of the barrel the first time that the acoustic means 10 sense a noise greater than or equal to the reference noise.

More particularly, the piloting means 200 are arranged to stop or prohibit the recoiling of the barrel the second time that the acoustic means 10 sense a noise greater than or equal to the reference noise.

More particularly, the acoustic means 10 are arranged to evaluate the sound gradient during the coiling of the barrel, and the piloting means 200 are arranged to compare this sound gradient with a reference recording.

More particularly, the acoustic means 10 are arranged to identify or/and to measure the variation in amplitude of the resonator 500 by listening to the noises of the escapement mechanism 600.

More particularly, the piloting means 200 are arranged to stop the coiling of the barrel 1 when the amplitude variation exceeds a predetermined threshold.

The invention also relates to a winding device 300 for a watch 1000, including means 400 for recoiling a barrel 1, and at least one such limiting device 100.

More particularly, at least one such limiting device 100 is arranged to constitute means for initial calibration of a watch 1000, by measuring the reference noise of its sliding flange 3, for the amplitude measurement or for the amplitude variation measurement of the watch by the acoustic means 10.

More particularly, the winding device 300 includes means 600 for identifying a watch 1000 for its calibration or its initial calibration.

More particularly, the winding device 300 includes rate and/or amplitude measurement means 700, which are arranged to make a rate and/or amplitude measurement on a watch 200 when the receptacle 20 carrying the watch 1000 is stationary.

What is claimed is:

1. A coiling limitation device for coiling a timepiece barrel integrated in a watch including a resonator cooperating with an escapement mechanism, said device comprising:

a motor configured to perform the coiling of said barrel, said barrel including at least one non-return notch arranged to cooperate with a sliding flange included in a spring of said barrel;

an acoustic device configured to acoustically monitor the coiling of said barrel of said watch positioned on a receptacle of said device, wherein the acoustic device is arranged to identify a reference noise which is a click noise during each start of cooperation between said sliding flange and said notch, wherein said motor is configured to stop the coiling of said barrel at an instant of a perception of said click noise or of a repetition of said click noise.

2. The limiting device according to claim 1, wherein said motor is configured to stop or prohibit the coiling of said barrel during execution of a measurement by said acoustic device.

3. The limiting device according to claim 2, wherein said motor is configured to stop or prohibit the coiling of said barrel when said acoustic device senses a noise greater than or equal to said reference noise.

4. The limiting device according to claim 3, wherein said motor is configured to stop or prohibit the coiling of said barrel a first time that said acoustic device senses the noise greater than or equal to said reference noise.

5. The limiting device according to claim 3, wherein said motor is configured to stop or prohibit the coiling of said barrel a second time that said acoustic device senses the noise greater than or equal to said reference noise.

6. The limiting device according to claim 1, wherein said acoustic device is arranged to identify said reference noise of each input in cooperation between said sliding flange and said notch.

7. The limiting device according to claim 1, wherein said acoustic device is arranged to identify and/or to measure a variation in amplitude of said resonator by listening to noises of said escapement mechanism.

8. The limiting device according to claim 7, wherein said motor is arranged to stop the coiling of said barrel when said variation in amplitude exceeds a predetermined threshold.

9. A device for winding said watch, including said limiting device according to claim 1.

10. The winding device according to claim 9, wherein said acoustic device is configured to perform an initial calibration of said watch by measuring said reference noise of said sliding flange.

* * * * *